Patented Nov. 6, 1928.

1,690,774

UNITED STATES PATENT OFFICE.

WALTER DUISBERG, OF LEVERKUSEN, NEAR COLOGNE, AND WINFRID HENTRICH AND LUDWIG ZEH, OF WIESDORF, NEAR COLOGNE, GERMANY, ASSIGNORS TO GRASSELLI DYESTUFF CORPORATION, OF NEW YORK, N. Y., A CORPORATION OF DELAWARE.

AZO DYESTUFF.

No Drawing. Application filed December 8, 1925, Serial No. 74,163, and in Germany December 19, 1924.

It is known that dyestuffs formed by the combination of diazotized o-aminobenzaldehyde with various coupling components are unstable. Kobylinsky (Dissertation Rostock, 1901) shows, for instance, that the dyestuff formed from o-aminobenzaldehyde and $\beta$-naphthol even in indifferent solvents such as ether readily changes into the colorless oxyindazol derivative.

If it is attempted to produce dyes from the oxim of the o-aminobenzaldehyde, the results are negative. Bamberger and Weiler, Journ. f. prakt. Chemie, vol. 58, II, 1898, page 342, show that in this case a ring closure takes place as a result of the diazotization.

It has now been found that thoroughly stable dyes may be obtained by treating the product of the combination of diazotized o-aminobenzaldehyde with various coupling components with hydroxylamine. These dyes are of especial interest in view of their property of easily forming stable metal compounds.

The invention is illustrated by the following examples:

(1) 121 parts of o-aminobenzaldehyde are diazotized in the usual way and coupled in an alkaline sodium carbonate solution with 337 parts of the sodium salt of 2-phenylamino-8-naphthol-6-sulfonic acid. When the coupling is complete the resulting azo compound is salted out, thoroughly washed with a solution of sodium chloride, mixed to a paste with water and then stirred for 24 hours with a solution of 139 parts of hydroxylamine hydrochloride and twice the amount of sodium acetate theoretically required; for example, 164 parts of anhydrous sodium acetate or a corresponding amount of crystalline sodium acetate. The resulting dyestuff is filtered out and washed with a solution of sodium chloride and dried. In its dry pulverized form it is a dark brown powder soluble in water and in concentrated sulfuric acid, forming brown colored solutions. It has in the form of the free acid most probably the formula:

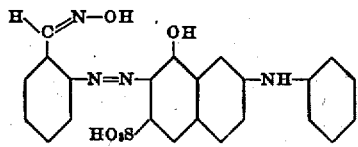

It dyes wool a clear brown color. By treating the dyed wool with chromium salts the color is intensified and its fastness properties improved.

(2) 121 parts of o-aminobenzaldehyde are diazotized in the usual way and coupled in an alkaline sodium carbonate solution with 347 parts of 1-ethylamino-8-naphthol-3.6-disulfonic acid. The coupling takes place quickly. The resulting azo compound is filtered off, thoroughly washed with a sodium chloride solution and thereafter treated with hydroxylamine as described in Example (1). The resulting dyestuff in its dry pulverized form is a dark colored powder, soluble in water and in concentrated sulfuric acid with a claret color. It has in the form of the free acid most probably the formula:

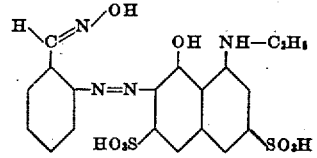

It dyes wool a claret color which becomes blue upon the treatment of the dyed wool with copper salts.

(3) 121 parts of o-aminobenzaldehyde are diazotized in the usual way and coupled in an acetic acid solution with 254 parts of methyl-4-sulfophenylpyrazolon. The resulting azo compound is filtered off, quickly washed with water and stirred for 24 hours in a solution of 139 parts of hydroxylamine hydrochloride (twice the amount theoretically required) and twice the amount of sodium acetate theoretically required; for example, 164 parts of anhydrous sodium acetate or a corresponding amount of crystalline sodium acetate. The resulting dyestuff is filtered off and dried. It has in the form of the free acid most probably the formula:

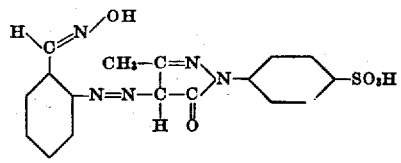

It dyes wool a clear yellow color, which by treating the dyed wool with copper salts changes to a yellowish brown.

The process described may be varied by simply neutralizing the acetic acid solution of the azo compound and immediately treating the resulting mass with the hydroxylamine hydrochloride and sodium acetate. In this way the azo compound which as soon as it is formed begins to change and is difficult to handle is stabilized.

(4) 242 parts of o-aminobenzaldehyde are diazotized in the usual way and coupled in an alkaline solution with 461 parts of 5.5'-dihydroxy-7.7'-disulfo-2.2'-dinapthylamine. The resulting azo compound is washed by decantation, filtered, washed again with sodium chloride solution, diluted to a paste with water, stirred for 24 hours at room temperature with a solution of 278 parts of hydroxylamine hydrochloride (twice the quantity theoretically required) and twice the quantity of sodium acetate theoretically required; for example, 328 parts of anhydrous sodium acetate or a corresponding amount of crystalline sodium acetate and finally filtered off and dried. In its pulverized form it is a dark colored powder soluble in water and in concentrated sulfuric acid. It has in the form of the free acid most probably the formula:

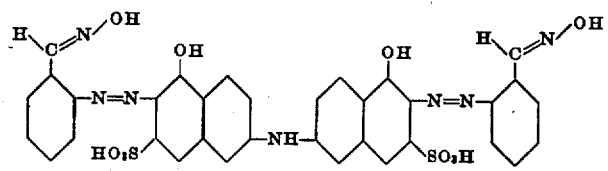

It dyes cotton a deep claret color and gives by treatment with copper salts clear violet dyeings which are very fast to light and washing.

(5) 137 parts of o-aminobenzoic acid are diazotized in the usual way and coupled in an acetic acid solution with 504 parts of 5.5'-dihydroxy-2.2'-dinaphthylurea-7'-disulfonic acid. After the coupling is completed the reaction mixture is rendered alkaline with sodium carbonate and there is added to it an ice-cold solution of diazotized o-aminobenzaldehyde. A second coupling takes place quickly. The resulting azo compound is salted out and filtered off and treated, as described in the foregoing examples, with a solution of 139 parts of hydroxylamine hydrochloride (twice the quantity theoretically required) and twice the quantity of sodium acetate theoretically required; for example, 164 parts of anhydrous sodium acetate or a corresponding amount of crystalline sodium acetate. The resulting dye-stuff is filtered off and dried. It has in the form of the free acid most probably the formula:

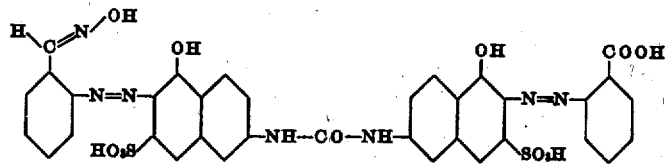

It dyes cotton a clear red color which upon treating the dyed cotton with copper salts is changed to a deep brownish-red shade.

Instead of the diazo compound of o-aminobenzoic acid of Example (5), various other diazo compounds may be used and the o-aminobenzaldehyde of the several examples may be substituted by its substitution products as well as by the compound produced by treating its so-called anhydrid:

see Berichte, vol. 17, page 457 (1884) with concentrated hydrochloric acid. The anhydride hydrolizes during the reaction so that the same dyestuffs are obtained in this case as when o-aminobenzaldehyde is used directly.

In the appended claims azo compound of o-aminobenzaldehyde is understood to include the azo compounds of o-aminobenzaldehyde itself and its substitution products.

We claim:

1. Process of making azo dyestuffs which comprises treating azo compounds of o-aminobenzaldehyde with hydroxylamine.

2. Azo dyestuffs substantially identical with dyestuffs obtained by treating azo compounds of o-aminobenzaldehyde with hydroxylamine.

3. An azo dyestuff of the general formula:

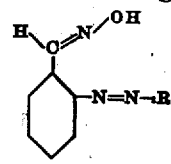

in which R is the radical of a coupling component.

4. An azo dyestuff of the general formula:

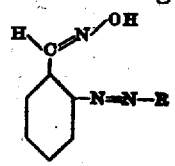

in which R is a radical containing two naphthalene nuclei connected by a nitrogen containing linkage of the group including —NH— and —NH.CO.NH—.

5. An azo dyestuff having in the form of the free acid the formula:

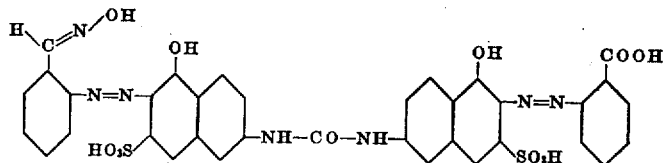

In testimony whereof, we affix our signatures.
WALTER DUISBERG.
WINFRID HENTRICH.
LUDWIG ZEH.

CERTIFICATE OF CORRECTION.

Patent No. 1,690,774.      Granted November 6, 1928, to

WALTER DUISBERG ET AL.

It is hereby certified that error appears in the printed specification of the above numbered patent requiring correction as follows: Page 2, line 34, for "7 prime-disulfonic" read "7.7 prime-disulfonic"; and that the said Letters Patent should be read with this correction therein that the same may conform to the record of the case in the Patent Office.

Signed and sealed this 11th day of December, A. D. 1928.

(Seal)

M. J. Moore,
Acting Commissioner of Patents.

containing linkage of the group including —NH— and —NH.CO.NH—.

5. An azo dyestuff having in the form of the free acid the formula:

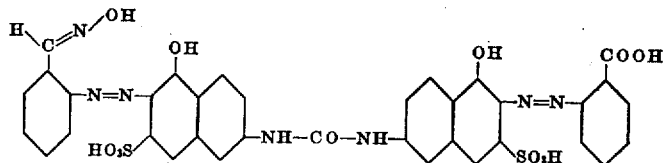

In testimony whereof, we affix our signatures.

WALTER DUISBERG.
WINFRID HENTRICH.
LUDWIG ZEH.

CERTIFICATE OF CORRECTION.

Patent No. 1,690,774.           Granted November 6, 1928, to

WALTER DUISBERG ET AL.

It is hereby certified that error appears in the printed specification of the above numbered patent requiring correction as follows: Page 2, line 34, for "7 prime-disulfonic" read "7.7 prime-disulfonic"; and that the said Letters Patent should be read with this correction therein that the same may conform to the record of the case in the Patent Office.

Signed and sealed this 11th day of December, A. D. 1928.

(Seal)                                M. J. Moore,
                                     Acting Commissioner of Patents.